United States Patent
Woodall et al.

(10) Patent No.: US 6,870,534 B1
(45) Date of Patent: Mar. 22, 2005

(54) METHOD OF SIMULATING EXPLOSIVE PERFORMANCE

(75) Inventors: Robert Woodall, Panama City Beach, FL (US); Felipe Garcia, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 525 days.

(21) Appl. No.: 10/145,619

(22) Filed: May 8, 2002

(51) Int. Cl.⁷ .................................................. G09B 9/00
(52) U.S. Cl. ...................... 345/440; 345/763; 434/366; 434/428; 434/429; 434/430
(58) Field of Search ................................ 345/440, 763; 434/366, 428, 429, 430

(56) References Cited

U.S. PATENT DOCUMENTS 3,558,865 A * 1/1971 Berndt et al. ............... 345/440

OTHER PUBLICATIONS

Gary D. Yngve, James F. O'Brien, Jessica K. Hodgins: Animating Explosions, Jul. 2000, Proceedings of the 27th annual conference on Computer graphics and interactive techniques. pp. 29–36.*

Claude Martins, John Buchanan, John Amanatides: Visually Believable Explosions in Real Time, Nov. 7–8, 2001, Computer Animation, 2001. The Fourteenth Conference on Computer Animation. Proceedings. pp. 237–259.*

R. E. Ewing, D. Mitchum, P. O'Leary, R. C. Sharpley, J. S. Sochacki: Distributed computation of Wave Propagation Models Using PVM, 1993, ACM Press, Proceedings of the 1993 ACM/IEEE conference on Supercomputing. pp. 22–31.*

* cited by examiner

*Primary Examiner*—Richard Hjerpe
*Assistant Examiner*—Blake Betz
(74) *Attorney, Agent, or Firm*—James T. Shepherd

(57) ABSTRACT

A method of simulating the effects of one or more explosive events utilizes a mapping of graphically-valued dots to describe the explosive event at detonation at a plurality of (x,y) positions. A degradation rule is applied to the mapping of dots at each of times $t_n$, for n=1 to N, to yield corresponding mappings of degraded value dots. The degradation rule specifies how the mapping of dots at detonation changes with time. The mapping at detonation and mappings of the degraded value dots are then simultaneously displayed in (x,y) registration with one another.

14 Claims, 2 Drawing Sheets

METHOD OF SIMULATING EXPLOSIVE PERFORMANCE

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

The invention relates generally to waveform interaction analysis and display of such waveform interaction, and more particularly to a method of simulating effects of one or more explosive events using, for example, pressure and impulse data associated with a single explosive event.

BACKGROUND OF THE INVENTION

Currently, development testing of obstacle breaching systems requires and has utilized numerous explosive tests. Results have indicated that increases in explosive performance are enhanced by spacing explosive charges from one another and then detonating them nearly simultaneously. More specifically, it was discovered that the shock-on-shock interaction between the discrete charges resulted in a greater destructive ability than that of a single charge of equivalent mass on a pound equivalent basis. Further, it was noted that different spacing between explosive charges yielded different performance results. The above discoveries led to the hypothesis that, for a given explosive charge size, an optimum spacing exists for some minimum number of charges. However, the current approach to determine such optimum spacing relies solely on expensive and dangerous empirical testing using live explosives.

SUMMARY OF THE INVENTION

Accordingly, it is an object of the present invention to provide a method of simulating the effects of an explosive event over time.

Another object of the present invention is to provide a method of simulating the effects of multiple explosive events.

Still another object of the present invention is to provide a graphic method of displaying the effects of multiple explosive events occurring at spaced-apart positions.

Yet another object of the present invention is to provide a graphic method of displaying the effects of multiple explosive events occurring at spaced-apart positions so that different charge sizes at different spacing intervals can be analyzed.

Other objects and advantages of the present invention will become more obvious hereinafter in the specification and drawings.

In accordance with the present invention, a method of simulating the effects of an explosive event utilizes a function $F(x,y,t)$ that describes an explosive event. The function defines a mapping of known values at a plurality of $(x,y)$ positions indicative of effects caused by the explosive event at a time of detonation $t=t_0$. A degradation rule is applied to the mapping of known values at each of times $t_n$, for $n=1$ to $N$, to yield corresponding mappings of degraded values. The degradation rule specifies how the mapping of known values changes with time. The mapping of known values and mappings of degraded values are then simultaneously displayed in $(x,y)$ registration with one another. Each "value" can be represented graphically as a displayed "dot" having its intensity, gray scale or color determined by the magnitude (e.g., pressure, impulse, etc.) of the value associated therewith.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
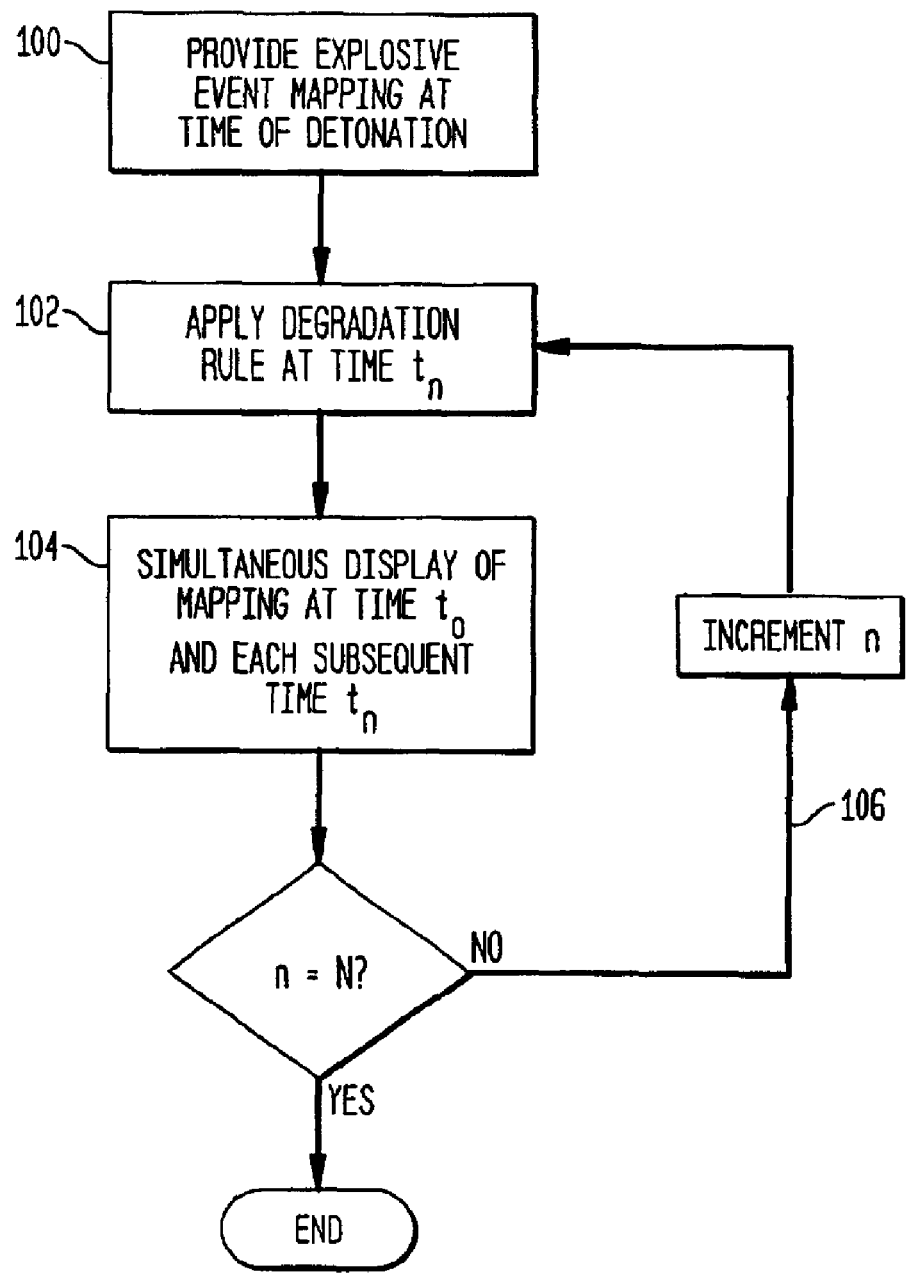
FIG. 1 is a block diagram depicting the steps used in simulating the effects of a single explosive event in accordance with the present invention.

Referring now to the drawings, and more particularly to FIG. 1, a top-level flowchart is shown of the method of simulating the effects of an explosive event in accordance with the present invention. For ease of understanding, the present method will first be described as it relates to a single explosive event. However, the present invention can also be used to simulate the effects of multiple, spaced-apart explosive events (occurring simultaneously or nearly simultaneously) as will be explained further below. The simulation of multiple explosive events is of great use in determining an optimum spacing for a given set of spaced-apart explosive charges.

Figure 2:
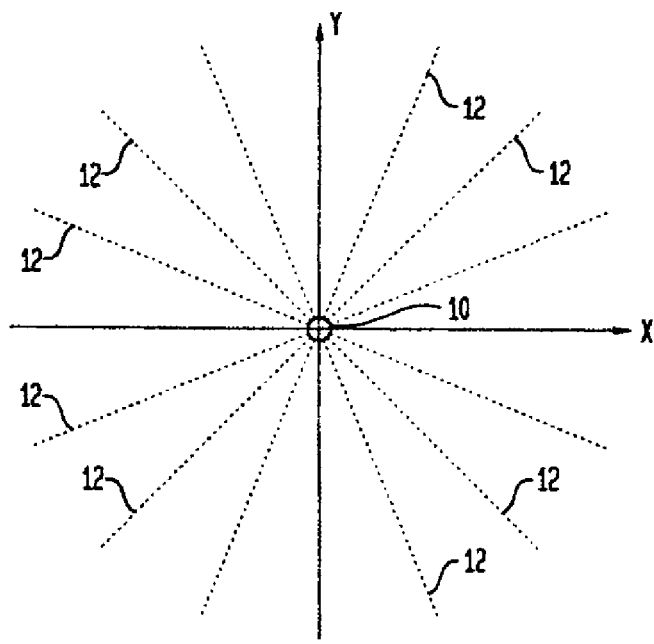
FIG. 2 is a schematic view of single explosive charge and the effects generated thereby at its time of detonation.

In the present invention, step 100 provides information on the explosive effects associated with a given charge at its time of detonation. In general, the explosive effects are described by a position-based, time-varying, function or $F(x,y,t)$ where the function's result at time $t$ is a value at an $(x,y)$ coordinate. Typically, the explosive effects are represented by empirically-measured pressure and impulse data which can be mapped on an $(x,y)$ coordinate system. For example, FIG. 2 illustrates an explosive charge 10 positioned on an $(x,y)$ coordinate axis at position $(0,0)$. At time of detonation or $t_0$ as it will be referred to herein, pressure and impulse data is known (e.g., empirically measured) at a number of $(x,y)$ positions. The pressure and impulse data at each position can thus be assigned a value that indicates the relative magnitude of the pressure and impulse data at that position. The relative value at each position can be graphically represented as a "dot" (e.g., a pixel, a printed mark, etc.). The resulting "dots" 12 define the mapping of the pressure and impulse data. While only a few-measurement positions are illustrated, the actual number of measurement positions would probably be much greater and can be varied without departing from the scope of the present invention. Indeed, accuracy of the present method improves with the number of known measurements.

Each mapped dot 12 graphically represents the relative magnitude of the value associated therewith. For example, in terms of a monochrome, CRT-type display, each dot 12 could have its intensity adjusted in accordance with the value associated with the corresponding pressure and impulse data. In terms of a printed display using only black ink, each dot 12 could have its grey scale adjusted in accordance with the pressure/impulse data value associated therewith. Still further, in terms of color displays/printers, each dot 12 can have its color adjusted in accordance with the pressure/impulse data value associated therewith.

With the "a priori" knowledge of the mapping of known values depicted in FIG. 2, the present method proceeds at step 102 by applying a degradation rule to the mapping of known values. More specifically, the change in each of dots 12 is projected to the next time increment in accordance with the velocity of the pressure and shock waves generated by explosive charge 10. Assuming spherical symmetry of shock wave movement at a known velocity, the incremental radial distance that the shock waves move for a given amount of time $\Delta t$ after time of detonation $t_0$ can be easily determined. Accordingly, step 102 applies a selected mathematical rule that reduces or degrades the value of each dot 12 at a time $t=t_0+n(\Delta t)$ after time of detonation. In terms of the mechanical pressure and impulse waves generated by explosive charge 10, a suitable degradation rule is defined as the value of each dot 12 reduced by the cube root of the radial distance that the pressure/impulse waves would travel from time of detonation to $t_0$ a given time $t_n$. It is to be understood that other degradation rules (i.e., transfer functions) could also be used without departing from the scope of the present invention. For example, if shock degradation through a particular material was of interest, one would use a (transfer function) degradation rule that accounted for the material's properties.

Step 104 displays the cumulative effective of the explosive event over time by simultaneously displaying dots 12 at time of detonation $t_0$ along with each subsequent mapping of degraded dots 12 at each time interval $t_n$ with the dots associated with each time $t_n$ being displayed in (x,y) registration with one another. The process of steps 102 and 104 is repeated for a desired number of N time intervals (e.g., seconds or fractions thereof) after time of detonation as indicated by loop 106. As a result, by evaluating the intensity, changing gray scale or changing color over the (x,y) mapping, one can calculate/predict the cumulative total effect of the interacting pressure and/or impulse waves (generated by the explosive event) at any given time $t_n$ at any (x,y) position after detonation. Such evaluation can be performed visually or through use of automated analyzers (e.g., densitometers in the case of changing grey scale levels or calorimeters in the case of changing colors).

As mentioned above, the present invention can be extended for use in simulating the effects of multiple, spaced-apart explosive events that occur simultaneously or nearly simultaneously. The term "explosive event" as used herein is meant to include impact events such as those caused by high velocity fragments impacting a target or target area. The present invention can also be used to estimate cratering events caused by an impact event.

Figure 3:
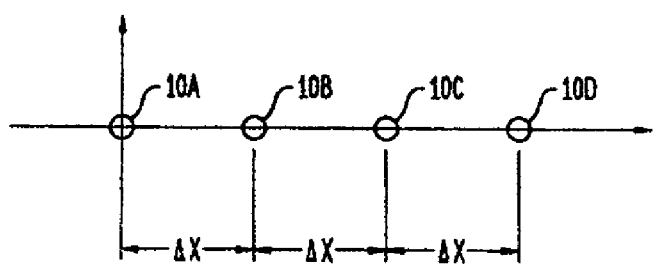
FIG. 3 is a schematic view of multiple, spaced-apart explosive charges.

The multiple, spaced-apart explosive events situation is illustrated in FIG. 3 for a set of line charges where four explosive charges 10A–10D are aligned on the x-axis of the (x,y) coordinate system. Spacing between adjacent ones of charges 10A–10D is given by $\Delta x$. While each of charges 10A–10D will typically be the same size charge, this is not required for the present invention. Rather, all that is required is the "a priori" knowledge of the mapping of known values (e.g., pressure and impulse data at time of detonation) for each of charges 10A–10D such as that described above with respect to FIG. 2. Then, the methodology described above with respect to FIG. 1 is applied in parallel for each of charges 10A–10D with the simultaneously display step 104 taking place on the same display at any given time $t_n$. As a result, the cumulative total effect of the interacting pressure and/or impulse waves for the set of charges 10A–10D can be seen/analyzed at any given time $t_n$ over the entire (x,y) coordinate area or any part thereof.

The present invention can simulate simultaneous detonation of charges 10A–10D such that time of detonation $t_0$ occurs at the same time for each charge. However, the present invention can also simulate the effects of near simultaneous detonation of charges 10A–10D. For example, sequential detonation of charges 10A–10D can be simulated by delaying each subsequent time of detonation $t_0$ by same small increment so that each charge's time of detonation is slightly different.

The advantages of the present invention are numerous. Knowledge of a single explosive event at detonation can be parlayed into a prediction of explosive effects over time for one or multiple, spaced-apart explosive events. The method is simple and produces a display that can be examined visually or via automation. The approach will find use in military applications (e.g., mine clearing) and civilian applications (e.g., mining, road construction, etc.). Use of the present invention provides a safe and inexpensive approach to prediction of explosive effects so that both effectiveness and impact on the surrounding environment/community can be evaluated.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of simulating the effects of an explosive event, comprising the steps of:

providing a function F(x,y,t) that describes an explosive event, wherein said function defines a mapping of known values at a plurality of (x,y) positions indicative of effects caused by said explosive event at a time of detonation $t=t_0$;

applying a degradation rule to said mapping of known values associated with said function at each of times $t_n$, n=1 to N, to yield corresponding mappings of degraded values, wherein said degradation rule specifies how said mapping of known values changes with time; and simultaneously displaying said mapping of known values and said mappings of degraded values in (x,y) registration with one another.

2. A method according to claim 1 wherein said explosive event is defined over time by moving mechanical waves of energy traveling at a known velocity, and wherein said degradation rule is defined at a time $t_n$ by a reduction of each of said known values by the cube root of a radial distance traveled by said moving mechanical waves from said time of detonation $t_o$ to said time $t_n$.

3. A method according to claim 1 wherein each of said known values and each of said degraded values is represented by a grey scale value indicative thereof.

4. A method according to claim 1 wherein each of said known values and each of said degraded values is represented by an intensity value indicative thereof.

5. A method according to claim 1 wherein each of said known values and each of said degraded values is represented by a color indicative thereof.

6. A method according to claim 1 wherein each of said known values defines pressure and impulse data associated with said explosive event at each of said plurality of (x,y) positions at said time of detonation $t_0$.

7. A method of simulating the effects of multiple explosive events, comprising the steps of:

providing a function $F(x,y,t)$ that describes an explosive event, wherein said function defines a mapping of known values at a plurality of (x,y) positions indicative of effects caused by said explosive event at a time of detonation $t=t_0$;

applying a degradation rule to said mapping of known values associated with said function at each of times $t_n$, n=1 to N, to yield corresponding mappings of degraded values, wherein said degradation rule specifies how said mapping of known values changes with time; and simultaneously displaying, at each of a plurality of spaced-apart positions, said mapping of known values and said mappings of degraded values in (x,y) registration with one another.

8. A method according to claim 7 wherein said explosive event is defined over time by moving mechanical waves of energy traveling at a known velocity, and wherein said degradation rule is defined at a time $t_n$ by a reduction of each of said known values by the cube root of a radial distance traveled by said moving mechanical waves from said time of detonation $t_0$ to said time $t_n$.

9. A method according to claim 7 wherein each of said known values and each of said degraded values is represented by a grey scale value indicative thereof.

10. A method according to claim 7 wherein each of said known values and each of said degraded values is represented by an intensity value indicative thereof.

11. A method according to claim 7 wherein each of said known values and each of said degraded values is represented by a color indicative thereof.

12. A method according to claim 7 wherein each of said known values defines pressure and impulse data associated with said explosive event at each of said plurality of (x,y) positions at said time of detonation $t_0$.

13. A method according to claim 7 wherein said step of simultaneously displaying is based on said time of detonation $t_0$ occurring at the same point in time at each of said plurality of spaced-apart positions.

14. A method according to claim 7 wherein said step of simultaneously displaying is based on said time of detonation to occurring at a different point in time at each of said plurality of spaced-apart positions.

* * * * *